ન

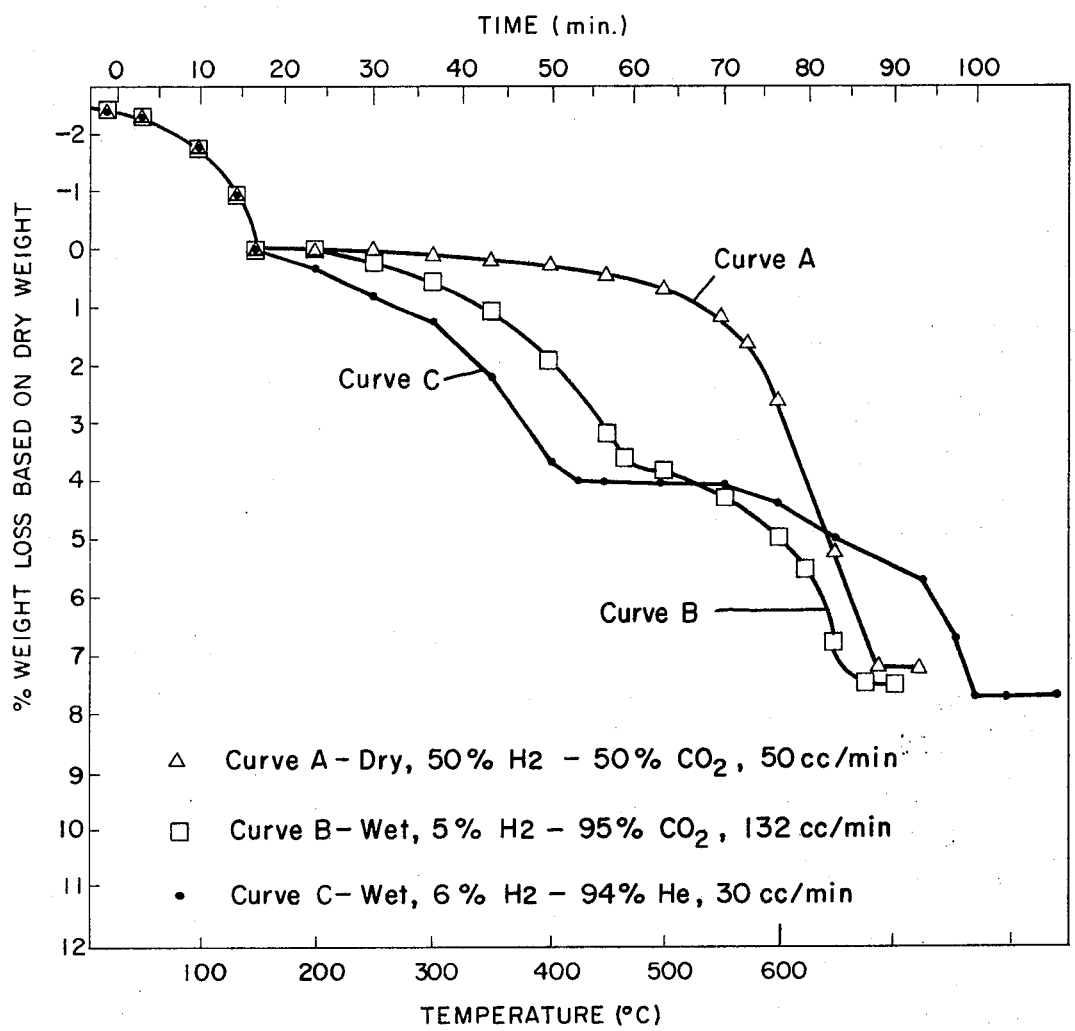

United States Patent Office 3,808,145
Patented Apr. 30, 1974

3,808,145
**CERAMIC DEFLUORINATION AND
REDUCTION PROCESS**
Douglas R. Packard, Sunol, and Mickey O. Marlowe,
Livermore, Calif., assignors to General Electric Company
Filed Nov. 3, 1971, Ser. No. 195,374
Int. Cl. C01g 43/02
U.S. Cl. 252—301.1 R          13 Claims

ABSTRACT OF THE DISCLOSURE

A process for deflourinating and controlling the oxygen-to-metal ratio of a particulate composition containing uranium compounds is conducted at a temperature in the range of about 200 to about 800° C. in an atmosphere having the essential components of water vapor which acts as a low temperature defluorination agent and a carrier gas of controlled oxygen partial pressure. The carrier gas can be a mixture comprising hydrogen and carbon dioxide, a mixture comprising carbon monoxide and carbon dioxide, and a mixture comprising an inert gas containing up to about 10 parts per million oxygen and a source of hydrogen. The introduction of water vapor greatly improves the removal of fluoride ions at temperatures below the temperatures at which oxygen removal from the particulate composition occurs. This process has two stages with the first lower temperature stage giving substantial removal of fluoride ions and the second higher temperature stage giving a substantial portion of the oxygen removal for controlling the oxygen-to-metal ratio of the particulate composition.

BACKGROUND OF THE INVENTION

This invention relates to a process for the defluorination of particulate compositions containing uranium compounds while controlling the oxygen-to-metal ratio of the defluorinated composition. One of the very important utilities of uranium oxides, especially uranium dioxide, is in nuclear power plants as a fuel in the generation of electric power. The uranium dioxide, either alone or in a mixture with other ceramic additives such as gadolinium oxide, plutonium oxide, silicon dioxide, titanium dioxide and alumnum oxide is produced from a hydrolysis-precipitation-reduction reaction sequence starting with uranium halides, usually uranium hexafluoride. The uranium is in the form of uranium hexafluoride to conveniently enable the enrichment of uranium with the U-235 isotope.

In greater detail, one representative method of preparing uranium dioxide from uranium hexafluoride has uranium hexafluoride reacted with water to hydrolyze the fluoride and form a water solution of uranyl fluoride and an acid. This water solution is reacted with ammonia to yield a precipitate of ammonium diuranate in a slurry. The ammonium diuranate slurry is converted to uranium dioxide by heating in hydrogen which achieves removal of any residual fluoride ions and reduction of the ammonium diuranate.

Attempts have been made to replace this involved, expensive ammonium diuranate conversion process by gas phase reaction of uranium hexafluoride with a very successful method being described in copending U.S. patent application Ser. No. 77,446 entitled, Process for Producing Uranium Dioxide Rich Compositions from Uranium Hexafluoride, which is hereby incorporated by reference. The foregoing application was filed Oct. 2, 1970 in the names of W. R. DeHollander and A. G. Dada and assigned to the same asignee as the present invention. The practice of the process of the foregoing application produces a uranium dioxide rich composition having particularly desirable properties and a fluoride impurity which is preferably removed before the composition is used as a fuel in nuclear power plants. Comparable heating of the uranium dioxide rich composition is necessary for removal of residual fluoride ions.

When a particulate composition such as a powder is heated to elevated temperatures, there is generally a decrease in the surface area of the powder after heating (or, stated differently, an increase in the average particle size) due to growth of the particles of the powder. The extent of decrease in surface area of the powder after a heating process depends on the particular temperature reached during the heating process, the time at temperature, the atmosphere maintained over the powder during heating, etc. While it is desirable to heat some powders to remove impurities, it is also desirable to minimize the surface area damage during heating to retain a high ceramic activity of the powder. A high surface area for a powder enables sintering compacted structures of the powder to high density at lower sintering temperatures than possible for a powder having a low surface area.

In the foregoing processes for preparing a ceramic grade of uranium dioxide, loss of the surface area of the resulting powder can occur due to the temperature needed for removal of the impurities, particularly the fluoride impurities, and the rate of removal of the impurities is relatively slow which means the amount of high surface area uranium dioxide produced is low. Since the partial pressure of oxygen in a wet hydrogen atmosphere is very low, the resulting uranium dioxide powder can also be pyrophoric.

From the foregoing, it has remained desirable to minimize the loss of surface area of powder during defluorination, increase the rate of defluorination of the powder at lower temperatures and use a controlled atmosphere to avoid developing pyrophorosity for the powder being defluorinated. A process achieving the foregoing would be very useful for defluorinating particulate compositions containing uranium compounds such as uranium dioxide to yield a uranium dioxide containing composition of high ceramic quality.

OBJECTS OF THE INVENTION

Accordingly it is an object of this invention to achieve a higher rate of defluorination at lower temperatures than practiced in the prior art of defluorinating compositions containing uranium compounds while minimizing of eliminating the surface area damage to the compositions during defluorination, giving an end product of a uranium oxide containing composition of high ceramic quality.

Another object of this invention is to provide a thermal process and a covering atmosphere which results in the separation of the defluorination reaction from the reduction reaction for a particulate ceramic composition.

Another object of this invention is the removal of appreciable fluoride concentrations in compositions containing uranium compounds during heating in a controlled atmosphere.

Still another object of this invention is to defluorinate powders of compositions containing uranium compounds and then cool the compositions in a controlled atmosphere to avoid developing pyrophoric compositions.

A further object of this invention is the use of an atmosphere comprising a mixture of water vapor as a low temperature defluorination agent and a carrier gas of controlled oxygen partial pressure to achieve removal of fluoride ions from particulate compositions containing uranium compounds.

For the preferred atmosphere of a mixture comprising carbon dioxide and hydrogen the atmosphere attains a thermodynamic equilibrium by the following reversible reaction:

$$CO_2 + H_2 \longleftrightarrow CO + H_2O.$$

The degree of reaction between the carbon dioxide and hydrogen is determined by the equilibrium constant of the above reaction which is a function of the temperature maintained for the atmosphere. The atomic ratio of oxygen-to-metal of the defluorinated composition tends to equilibrate with the partial pressure of oxygen in the system with a fixed value at a given temperature. The desired oxygen-to-metal ratio of the fluorinated composition can be achieved by adjusting the partial pressure of oxygen in the atmosphere maintained over the composition during the process. The partial pressure of oxygen in the atmosphere can be reduced by an increase in the hydrogen content of the atmosphere and an increase in the partial pressure of oxygen in the atmosphere is achieved by an increase in the carbon dioxide content of the atmosphere.

In the practice of this invention, the water vapor is introduced as a gaseous component in a mixture with the carrier gas, and the water vapor acts as a hydrolysis agent for removing fluoride ions from the composition containing uranium compounds. After treatment with the gas compositions set forth in this invention, the final fluoride ion content of the composition is less than 300 parts per million. This represents a significant reduction in the fluoride ion content as commercially available enriched uranium oxide powders suitable for fabrication and use in nuclear applications can contain up to 70,000 parts per million of fluoride ions as well as other impurities. By choosing an atmosphere having a mixture comprising water vapor and carrier gas having the desired partial pressure of oxygen, a uranium oxide containing composition can be reduced to the desired oxygen-to-metal ratio and have a high surface area per unit weight of composition.

The invention can be used, for example, in a batch process where the particulate compositions containing uranium compounds are placed in a suitable container in a cold furnace, heated through a selected temperature cycle in the water vapor-carrier gas atmosphere for a period of time of from about 1 to about 4 hours followed by cooling the powder in a controlled atmosphere such as hydrogen, carbon dioxide, an inert gas such as argon or a mixture of hydrogen and carbon dioxide in any proportions.

The invention can also be used, for example, in a continuous process where the particulate composition containing uranium compounds is continuously introduced and withdrawn from a furnace with temperature being maintained in the furnace within the foregoing temperature ranges. The particulate composition can be withdrawn from the funrace and held in a controlled atmosphere as set forth in the preceding paragraph. Representative of the furnaces capable of being used include the furnaces set forth in FIGS. 1 and 2 of U.S. patent application Ser. No. 62,308, filed Aug. 10, 1970 in the name of Yogesh Nivas and assigned to the same assignee as the present invention which application is hereby incorporated by reference.

A particulate uranium oxide product, for example, a uranium dioxide product in which the ratio of oxygen-to-metal atoms is about 2.1:1±0.07:1, may be achieved as an end product in the practice of this invention by cooling the particulate uranium oxide product in a controlled atmosphere as set forth above. This achieves a high surface area for the resulting particulate powder, an oxygen-to-metal ratio of about 2.1:1±0.07:1 and a fluoride ion content of less than 300 parts per million. In another preferred practice of this invention, a dried composition having ammonium diuranate with fluoride impurities is heated under the atmosphere disclosed in this invention and cooled under a controlled atmosphere to yield a uranium dioxide rich composition.

When the compositions treated in the practice of this invention contain plutonium dioxide, plutonium dioxide is present in an amount up to about 30 percent by weight, and when the compositions treated in the practice of this invention contain gadolinium oxide it is present in an amount up to about 10 percent by weight.

This invention has the advantage of achieving a more rapid rate of defluorination, no damage or very minimal damage to the surface area of the treated composition and a controlled oxygen-to-metal ratio for the treated composition. The present invention also has the advantage of controlling the partial pressure of oxygen in the furnace by selection of the carrier gas portion of the atmosphere in the furnace. Further, in a preferred embodiment of this invention, this invention has the advantage of varying the proportions of water vapor, carbon dioxide and hydrogen in the atmosphere in the furnace, with the proportion selected depending among other things upon the relative amounts of fluoride ion in the powder and the oxygen-to-metal ratio desired for the treated powder.

This invention is further described by the following examples which are offered to be illustrative of the invention and do not serve to limit the invention in any manner.

EXAMPLES 1–3

These experiments are designed to continuously monitor the weight of a small sample of powder as a function of time and temperature. The device used for these experiments in a Cahn recording microbalance mounted in an enclosed volume capable of permitting a flowing gas mixture to pass over the sample. Each sample is uranium dioxide with about 5.00 percent by weight fluoride ion, an average particle size of about 0.20 micrometer ($\mu$m.) and an oxygen-to-metal ratio of about 2.56. The sample is placed in a platinum crucible which hangs from the balance. The sample contains some water which is shown on the accompanying figure as a negative percent weight loss since the first change in weight will reflect the removal of the water content.

A quartz tube surrounds each sample in the furnace region. Temperature is recorded from the output of platinum-platinum+10% rhodium thermocouple placed adjacent to the sample. The balance and thermocouple provide a continuous record of sample weight and temperature as a function of time, called thermal gravimetric experiments.

Figure 1:
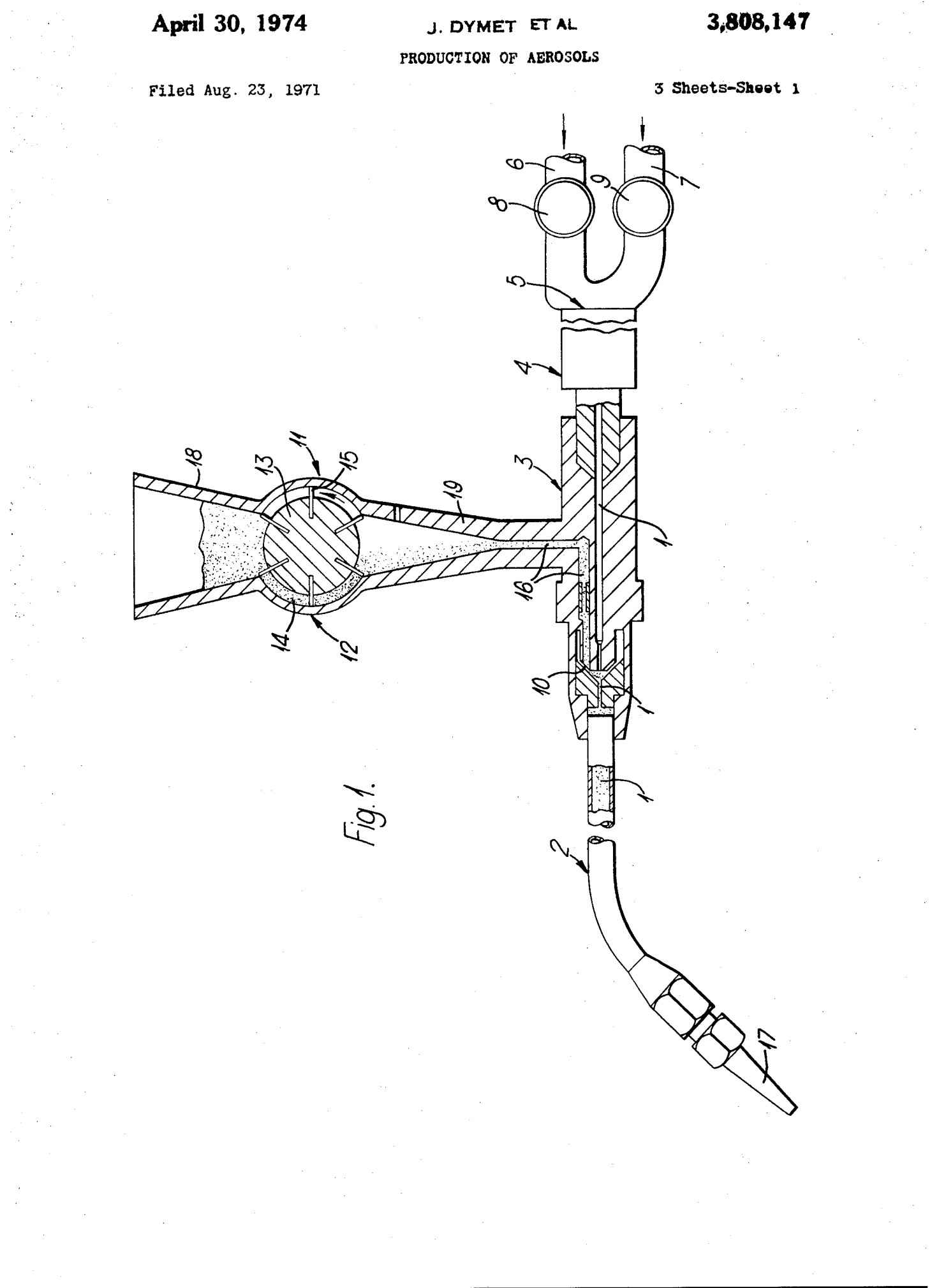

The results of three such thermal gravimetric experiments starting with identical weights of the same uranium dioxide material described above are recorded in FIG. 1 in percent weight loss as a function of temperature and time during the heating cycle. The heating rate for each example was 7.5° C./minute starting from a temperature of 25° C. up to the maximum temperature of 600° C.

Curve A represents the behavior of the defluorination-reduction process with a dry 50% hydrogen-50% carbon dioxide mixture. This curve shows that there is no distinction between different parts of the process and that the greater proportion of weight loss occurs at higher temperatures. Curve B represents the behavior of the defluorination-reduction process with a wet gas mixture of 5% hydrogen-95% carbon dioxide mixture (bubbled through water to give an atmosphere containing water vapor). This curve shows that there is a distinct separation of the process into two steps with the first step being primarily a fluoride removal step and the second step being an adjustment of the oxygen content of the composition. The sharp change in slope in Curve B represents the separation between the two steps. Curve C represents the behavior of the defluorination-reduction process with a wet gas mixture of 6% hydrogen-94% helium mixture (also bubbled through water to give an atmosphere containing water vapor). This also shows that there is a distinct separation of the process into two steps with the first step being primarily a fluoride removal step and the second step being an adjustment of the oxygen content of the composition. The sharp change in slope in Curve C represents the separation between the two steps.

This experiment shows that the water vapor is the mechanism limiting the removal of fluoride ions from the ceramic material being treated. The water vapor resulting from the reaction of hydrogen and carbon dioxide for the dry hydrogen-carbon dioxide atmosphere is the prime producer of defluorination when supplemental water vapor is not introduced as a gas constituent in the furnace atmosphere. In this experiment the water vapor was added to the atmosphere for Curves B and C by bubbling the gas through water and the molar percent of water vapor in the atmosphere by use of the bubbler is about 12% for Curves B and C.

EXAMPLES 4–7

Surface area experiments

Three samples of approximately 10 grams each of undefluorinated $UO_2$ powder were defluorinated in 50% $H_2$-50% $CO_2$ by heating at approximately 7.5° C./min. to 600° C. and holding for 50, 124 and 325 minutes, respectively. Surface area measurements by the Brunauer-Emmett-Teller technique (nitrogen absorption technique) were performed on each of the resulting powders. The starting powder (undefluorinated) had a surface area of 10 grams was defluorinated using the same 50% $H_2$-50% 10 grams was defluorinated using the same 50% $H_2$-50% $CO_2$ gas mixture bubbled through water held at approximately 40° C. Water condensation between the bubbler and defluorination chamber was prevented by using heated lines. The seventh sample was heated from room temperature (25° C.) to 450° C. at 7.5° C./minute, and held at 450° C. for 160 minutes; then the temperature was increased to 600° C. at the rate of 7.5° C./minute and held at 600° C. for another 45 minutes. The heating schedule for this seventh experiment was determined from Curve B in the figure which indicates that major fluoride ion losses are complete at about 450° C. and substantial oxygen loss has not yet begun. The subsequent temperature increase was to remove oxygen and reduce the oxygen-to-metal ratio to the desired range. The measured surface area of this sample before and after defluorination and reduction was about 6.7 m.$^2$/gram and about 6.3 m.$^2$/gram respectively. Table 1 summarizes the results of the surface area experiments.

TABLE 1

| Example | Temp. (° C.) | Time in minutes at temp. | Initial surface area (m.²/gram) | Final surface area (m.²/gram) | Final fluorine (parts per million) |
|---|---|---|---|---|---|
| 4 | 600 | 50 | 6.1 | 5.1 | 200 |
| 5 | 600 | 124 | 6.1 | 4.9 | 40 |
| 6 | 600 | 325 | 6.1 | 5.0 | 10 |
| 7 | 450 / 600 | 160 / 45 | 6.7 | 6.3 | 12 |

It is to be understood that, although the invention has been described with specific reference to particular embodiments thereof, it is not to be so limited, since changes and alterations therein may be made which are within the full intent and scope of this invention as defined by the appended claims.

What is claimed is:

1. For a particulate composition comprising uranium compounds selected from the group consisting of uranium fluorides, uranium oxyfluorides, alkaline diuranates with fluoride impurities, uranium oxides with fluoride impurities and mixtures thereof, a method of defluorinating and controlling the oxygen-to-metal ratio within the range of about 2.03:1 to about 2.17:1, said method comprising the steps of heating the particulate composition at a temperature in the range of about 200 to about 800° C. in an atmosphere having the essential components of water vapor and a gas comprising a mixture of hydrogen and carbon dioxide and thereafter cooling under an atmosphere inert to the particulate composition.

2. A method according to claim 1 where the atmosphere during heating has from about 5 to about 25 percent water vapor by volume.

3. A method according to claim 1 where the atmosphere during heating has from about 5 to about 15 percent water vapor by volume.

4. A method according to claim 1 where the composition contains uranium dioxide with fluoride impurities.

5. A method according to claim 1 where the composition contains ammonium diuranate with fluoride impurities.

6. A method according to claim 1 where the cooling atmosphere is a mixture of hydrogen and carbon dioxide.

7. A method according to claim 6 in which the cooling atmosphere has from about 2 to about 95 percent hydrogen by volume and the balance is carbon dioxide.

8. A method according to claim 1 where the cooling atmosphere is carbon dioxide.

9. A method according to claim 1 where the cooling atmosphere is hydrogen.

10. A method according to claim 1 where the cooling atmosphere is an inert gas.

11. A method according to claim 1 in which the gas comprises from about 2 to about 95 percent hydrogen by volume and the balance is carbon dioxide.

12. A method according to claim 1 where the composition is a mixture of uranium dioxide and plutonium dioxide with fluoride impurities, the plutonium dioxide being present in an amount up to about 30 percent by weight of the mixture.

13. A method according to claim 1 where the composition is a mixture of uranium dioxide and gadolinium oxide with fluoride impurities, the gadolinium oxide being present in an amount up to about 10 percent by weight of the mixture.

References Cited

UNITED STATES PATENTS

| 3,579,311 | 5/1971 | McCoy | 423—261 |
| 2,953,430 | 9/1960 | Leaders et al. | 423—261 |
| 3,272,602 | 9/1966 | Suehiro et al. | 423—261 |
| 3,375,306 | 3/1968 | Russell et al. | 264—0.5 |
| 3,263,004 | 7/1966 | Bean | 264—0.5 |
| 3,519,403 | 7/1970 | Vietzke et al. | 423—261 |
| 3,547,598 | 12/1970 | Knudsen | 423—261 |
| 3,235,327 | 2/1966 | Blundell et al. | 423—261 |

CARL D. QUARFORTH, Primary Examiner

R. L. TATE, Assistant Examiner

U.S. Cl. X.R.

264—0.5; 423—260, 261

Fig.1.

UNITED STATES PATENT OFFICE
CERTIFICATE OF CORRECTION

Patent No. 3,808,145          Dated 30 April 1974

Inventor(s) D. R. Packard/M. O. Marlowe

It is certified that error appears in the above-identified patent and that said Letters Patent are hereby corrected as shown below:

Column 1, line 66, omit the comma after "entitled," and line 68, omit the comma after "Hexafluoride". Column 2, line 50, "of" should be --or--. Column 6, line 34, "in" should be --is--. Column 7, line 30, after "of" insert --about 6.1m$^2$/gram. The seventh sample of approximately--; and line 32, delete "10 grams was defluorinated using the same 50% H$_2$-50%."

Signed and sealed this 19th day of November 1974.

(SEAL)
Attest:

McCOY M. GIBSON JR.        C. MARSHALL DANN
Attesting Officer           Commissioner of Patents